United States Patent Office 3,070,427
Patented Dec. 25, 1962

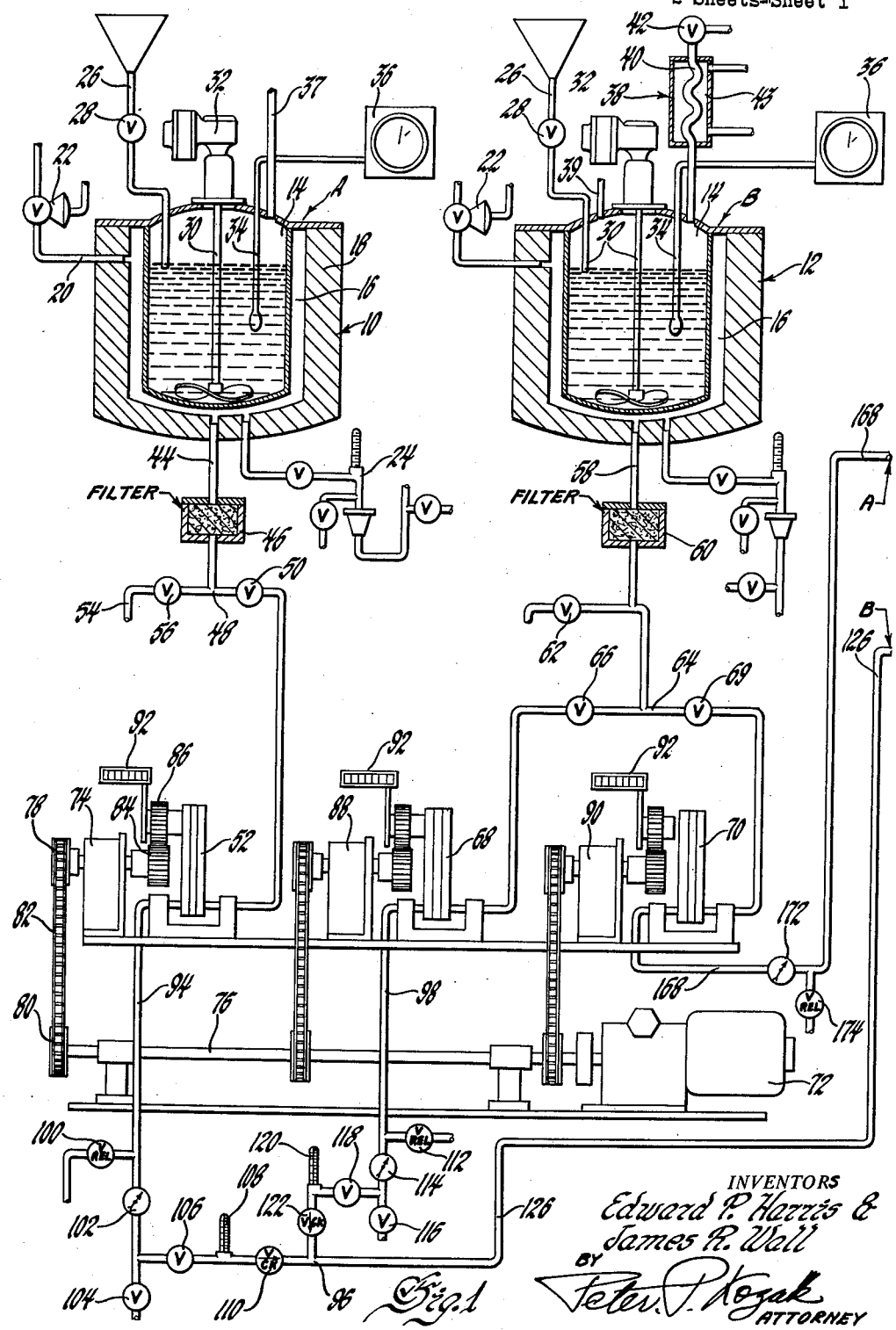

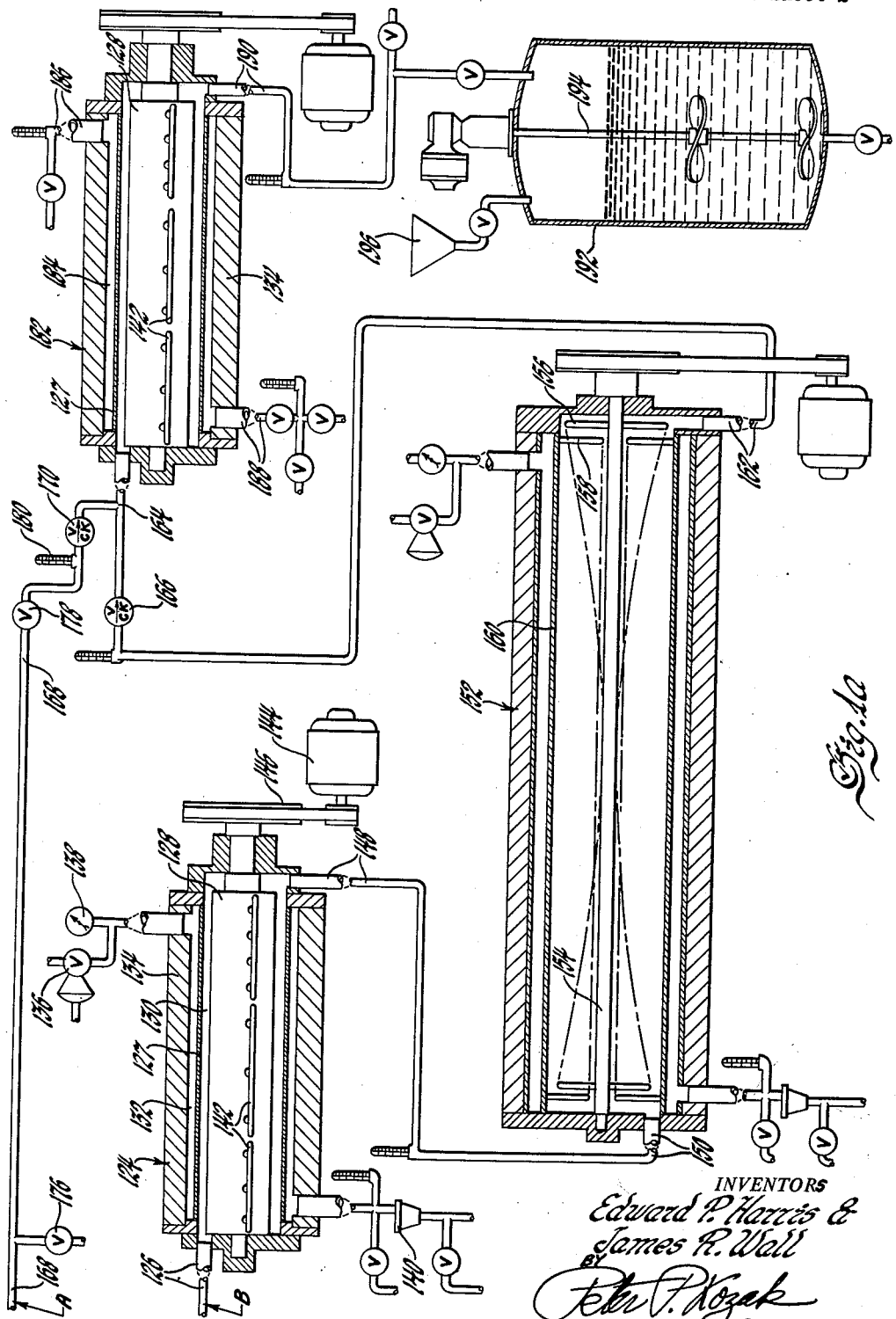

3,070,427
POLYMERIZATION APPARATUS
Edward P. Harris and James R. Wall, Dayton, Ohio, assignors to General Motors Corporation, Detroit, Mich., a corporation of Delaware
Filed July 23, 1958, Ser. No. 750,333
3 Claims. (Cl. 23—260)

This invention relates to improvements in processes for the manufacture of polyurethane plastics.

It is well known that a wide variety of plastic materials of a rigid, semi-rigid or elastic consistency generally known as polyurethane plastics, may be made by an essentially polyaddition reaction of a wide variety of organic materials containing free hydrogen reactive groups and organic polyisocyanate compounds. In the manufacture of suitable products, various cross-linking materials, catalytic agents, reaction controlling ingredients, plasticizers, fillers, and other materials effecting the physical and chemical properties of the products may be added to the reaction mixture.

Among the organic materials having free reactive hydrogen groups which may be utilized are polyesters, polyesteramides, alkylene glycols, polyisocyanates-modified alkylene glycols, polyoxyalkylene glycols, polyisocyanate-modified polyoxyalkylene glycols, castor oil, etc.

Suitable organic polyisocyanates which may be utilized in the production of polyurethane products are 2,4 toluene di-isocyanate and 2,6 toluene di-isocyanate, ethylene di-isocyanate, propylene 1,2 di-isocyanate, butylene di-isocyanate, 1,3 di-isocyanate, hexylene di-isocyanate, cyclohexylene 1,2 di-isocyanate, M-phenylene di-isocyanate, 3,3 dimethyl, 4,4 diphenylene di-isocyanate, tri-phenyl methane tri-isocyanate, 1,5 naphthalene di-isocyanate and suitable mixtures of these and other similar polyisocyanates.

A reaction mixture may include an organic polyisocyanate and one or more of the above mentioned reactive hydrogen group containing organic materials as for example a mixture of a good commercial grade of castor oil and polyethylene glycol in suitable proportions wherein the latter serves as cross-linking or a chain-extending function, and a copolymer of polypropylene glycol and polyethylene glycol or a mixture of these glycols together with suitable proportions of trimethylol propane, or other polyfunctional active hydrogen compounds wherein the latter serves a cross-linking function. The mixtures may include various ingredients which influence the reaction such as diethanolamine and 1,4 ethanol 2 methyl piperazine, foam producing additives such as water, plasticizers such as dioctyl sebacate and various fillers adapted to provide the resulting products with suitable chemical and physical properties.

The production of a particular polyurethane product involves a suitable selection of materials such as is indicated above which are well described in the patent literature or are otherwise well known in the art and in itself forms no part of the present invention. Regardless of the particular combination of materials utilized, one method of mixing and reacting the materials to produce polyurethane plastics involves feeding a first component into an enclosed mixing chamber including the organic material containing a plurality of hydrogen reactive groups, a second component including the organic polyisocyanate and a third component including a material capable of accelerating or otherwise influencing the reaction. In this method the three components may be fed in suitably metered quantities into a mixing chamber separately and simultaneously or the second component may be fed into the mixing chamber in physical admixture with either the first or third component.

The reaction process referred to above involves a series of complex physical and chemical reactions, and the manufacture of reproducible homogeneous products which are uniform in texture and have uniform chemical and physical properties, require a thorough, intimate and ideally instantaneous mixing of the components even though the viscosity and the relative quantities of the components may vary widely with respect to each other and the reaction may be accompanied by considerable viscosity changes and the evolution of heat and gases such as carbon dioxide. It is readily apparent that the provision of apparatus for ideally carrying out the above process whereby an ideally uniform and homogeneous product is obtained is extremely difficult.

In another method of producing polyurethane plastics wherein the complexity of the reaction process is reduced, the reactive hydrogen containing polymeric material is first reacted with the polyisocyanate component to form in intermediate polymer containing substantially no free hydrogen reactive groups and a predetermined excess of isocyanate groups.

It is a basic object of this invention to provide an improved process and apparatus for use in the manufacture of foamed polyurethane plastics whereby the reaction of the various components leading to the formation of the foam is highly controlled and a foam polyurethane product of uniform consistency having uniform physical and chemical properties is produced.

A more specific object of the invention is to provide an improved process and apparatus for the manufacture of polyisocyanate foams whereby an intermediate polyisocyanate-modified polymer having highly uniform chemical and physical properties and having a predetermined percentage of free isocyanate groups is continuously produced.

In accordance with the process, the precursor components including a polymeric material having a plurality of hydrogen reactive groups and an organic polyisocyanate are continuously passed through apparatus whereby the components are brought together in a predetermined ratio, simultaneously mixed and rapidly raised to a predetermined reaction temperature, reacted for a predetermined time to form a polyisocyanate-modified polymer, and then rapidly cooling the reaction product below the reaction temperature while optionally mixing therewith a predetermined excess of the polyisocyanate component, to continuously form a polyisocyanate-modified polymer which may then be further reacted with other materials capable of inducing further reactions of the polymer and to produce polyurethane foam products.

These and other objects are accomplished by he provision of apparatus including a first high velocity mixer and heat exchanger unit, a second mixer and heat exchanger unit connected to the first mixer and heat exchanger unit in fluid-flow-relationship, a third high velocity mixer and heat exchanger unit connected to the second mixer and heat exchanger in fluid-flow-relationship, conduit and variable output pump means for feeding a polymeric precursor component having a plurality of hydrogen reactive groups into the first mixer and heat exchanger unit, a second conduit and variable output pump means for feeding a polyisocyanate component into said first mixer and heat exchanger unit, a third conduit and variable output pump means for feeding the polyisocyanate component into the third mixer and heat exchanger unit, and drive and control means for simultaneously varying the output of the three variable output pump means in accordance with predetermined ratios.

In operation the precursor components are continuously fed to the first mixer and heat exchanger unit in a predetermined ratio wherein they are rapidly mixed and raised to a predetermined temperature, the mixed and heated reactants are then continuously fed into the second mixer and heat exchanger unit wherein they are maintained at the reaction temperature and reacted for a predetermined time. The reacted material is then continuously fed into the third mixer and heat exchanger unit wherein the reacted material is further admixed with a predetermined amount of the polyisocyanate component and rapidly cooled to produce an intermediate polymer or prepolymer containing a predetermined percentage of free isocyanate groups suitable for use in the production of polyisocyanate foams. The flow of the precursor materials is controlled by a single means associated with a variable speed power means whereby the flow rate of the components may be varied while maintaining the flow in accordance with predetermined ratios.

Further objects and advantages of the present invention will be apparent from the following description, references being had to the accompanying drawing wherein a preferred embodiment of the invention is clearly shown in the form of a single diagrammatic view of the apparatus embodying the invention.

As heretofore noted, the present invention is concerned with the production of polyisocyanate-modified polymers or prepolymers which are to be subsequently reacted with a component capable of causing a further reaction of the polyisocyanate-modified prepolymer accompanied by further polymerization, cross-linking, chain extending, etc., and the evolution of carbon dioxide to form a polyurethane foam. For convenience, the polyisocyanate-modified polymer above described will be referred to as a prepolymer.

In general, the prepolymer is prepared by the reaction of a polymeric material having a plurality of hydrogen reactive groups which for convenience may be termed component A and a polyisocyanate component which for convenience may be termed component B. Referring to the drawings, FIG. 1 and FIG. 1a, the apparatus of the invention, include enclosed feed tank units 10 and 12 for holding the components A and B respectively. The tank 10 preferably consists of a tank shell 14 for containing the component A and a steam jacket 16 surrounding the tank shell 14, insulated by means of an insulating jacket 18. The steam jacket 16 is provided with a steam inlet means 20 controlled by a diaphragm valve 22 for maintaining the steam in the steam jacket at a constant predetermined pressure and hence a constant temperature. The steam jacket 16 is also provided with a suitable steam trap 24 of any conventional construction for evacuating the condensate from the steam jacket without loss of steam or pressure in a manner well known in the art. The tank 14 is provided with a component A inlet 26 controlled by a valve 28, a mixing member 30 driven by a motor 32, and a temperature measuring means preferably in the form of a thermocouple 34 operably connected to a temperature recording device 36 of well known design. It also includes a conduit means 37 for admitting dry air under pressure into the tank 14.

The tank unit 12 for containing the component B is identical in basic construction to the tank unit 10 including a dry air inlet conduit 39 and additionally including a reflux condenser 38 for condensing and returning to the tank material which may have volatilized in the process of heating the polyisocyanate component. The reflux condenser may be of any suitable design as for example a tubular coil 40 closed by the valve 42 and cooled by means of a cold water jacket 43.

The component A material outlet conduit 44 from the tank 14 passes through a filter 46 preferably in the form of a screen suitable for filtering relatively viscous liquids, through a T connection 48, a valve 50 and to a first pump 52. A drain pipe 54 controlled by valve 56, is connected to the T connection 48 to permit the draining of the tank 14.

In a similar manner the component B material outlet 58 from the tank unit 12 passes through a filter 60, includes a drain valve 62 and divides at the T connection 64 to provide fluid flow connection to a second pump 68 through valve 66 and to a third pump 70 through the valve 69.

The pumps 52, 68 and 70 are all of the positive displacement type to insure delivery of liquid at a constant predetermined rate. The pump 52 which must handle a greater volume of liquid in the form of the polymeric component A is preferably larger than the pumps 68 and 70 which are designed to handle relatively small quantities of the polyisocyanate component B. An example of a suitable pump 52 is a Number 5 Zenith pump having a rated capacity of 2.93 cubic centimeters per revolution and an example of a suitable pump 68 or 70 is a Number ½ Zenith pump having a rated output of 0.297 cubic centimeter per revolution.

The pumping mechanism of the pump 52 is driven by means of a variable speed electric motor 72 through an infinitively variable speed reducer 74. To this end, the motor 72 is connected to a drive shaft 76 which in turn is drivingly connected to the driven chain sprocket 78 of reducer 74 by means of the chain sprocket 80 rigidly connected to the drive shaft 76 and drivingly connected to the chain sprocket 78 by the drive chain 82. The driven gear 84 of the reducer meshes with the gear 86 drivingly connected to the pumping mechanism.

The pumping mechanism of the pumps 68 and 70 are driven by means of the motor 72 through speed reducers 88 and 90 identical to the speed reducer 74 and by identical chain drive means as shown in the drawing. Each pump is preferably provided with a combination tachometer and revolution counter 92.

The speed reducers 74, 88 and 90 are preferably of the positive drive type whereby the output rate of the pumps may be accurately controlled. An example of a suitable speed reducer is the Revco-Zero Maximum Torque Converter Number 143 manufactured by Revco, Incorporated, Minneapolis, Minnesota, which is an infinite range, variable stroke power device in which the power is transmitted from the power input member 78 to the output member 84 by means of a series of linkages mounted side by side in phase sequence.

The output conduit 94 from the pump 52 leads to a T connection 96 at which point it is joined by the output conduit 98 from the pump 68. The conduit 94 includes a pressure relief valve 100, a pressure gauge 102, a drain valve 104, a gate valve 106, a temperature gauge 108, and a check valve 110. Similarly, the output conduit 98 from the pump 68 includes a pressure relief valve 112, a pressure gauge 114, a drain valve 116, a gate valve 118, a temperature measuring device 120 and a check valve 122. It is readily apparent that the check valve 110 insures against the entry of the component B to the conduit 94 and similarly the check valve 122 insures against the entry of the component A into the conduit 98. The pressure relief valves 100 and 112 are safeguards against excessive pressure developing due to a plugging up of the system, and the drain valves 104 and 116 together with the gate valves 106 and 118 provide means for draining the apparatus at this point, and the pressure gauges 102 and 114 and the temperature measuring devices 108 and 120 provide means for controlling the operation of the system.

The T connection 96 is connected directly to a first high velocity and mixer unit 124 by means of the conduit 126. Although the conduit 126 is shown as a relatively long pipe, in practice the T connection 96 is located in close proximity to the input opening of the unit 124 so as to avoid a significant reaction of the components A and B until they are mixed and heated to the predetermined reaction temperature in the unit 124.

The high velocity heat exchanger and mixer unit 124 consists essentially of an elongated cylindrical portion 127 in which is rotatably disposed the drum 128 so as to provide an elongated relatively thin annular space 130 into which the components A and B are caused to flow. The cylindrical member 127 is constructed of a relatively thin metal and is surrounded by a steam jacket 132 blanketed by an insulating jacket 134. The steam inlet is provided with a diaphragm operated valve 136 and a pressure gauge 138, and a steam trap assembly 140 is provided, whereby the temperature within the steam jacket may be accurately controlled. The drum 128 is provided with a plurality of mixing and scraping blades 142 whereby the inner surfaces of the cylindrical portions 127 are continuously scraped clean to expose the surface thereof to fresh portions of the components A and B mixture and to thereby effect a rapid and efficient heating or mixing of the components. The drum 128 is preferably driven by means of an electric motor 144 through a belt and pulley arrangement 146.

The outlet conduit 148 of the unit 124 leads to the inlet conduit 150 of a second heat exchanger and mixer unit 152. This unit is similar in construction to the unit 124 and differs basically in the provision of a rotor in the form of shaft 154 having a plurality of radially disposed fingers 156 attached thereto along the length thereof, alternating with a plurality of radially disposed fingers 158 attached to the elongated cylindrical casing 160 along the length thereof.

The outlet 162 from the unit 152 is connected to a T connection 164 through a check valve 166. The outlet 158 from the pump 70 is also connected to the T connection 164 through the check valve 170. The line 168 is provided with a pressure gauge 172, a pressure relief valve 174, a drain valve 176, a gate valve 178, and a temperature measuring device 180 such as a thermometer as in the case of the lines 94 and 98 and for the same reasons.

The T connection 164 leads directly into a third high velocity mixer and heat exchanger unit 182. The unit 182 is identical to the unit 124 except that the steam jacket of the latter is replaced by cold water jacket 184 including a water input conduit 186 and a water outlet 188. The material outlet 190 from the unit 182 leads to a storage tank 192 which is preferably provided with an electric motor driven stirring element 194 and a material inlet conduit 196 through which non-reacting ingredients such as plasticizers, defoamers and the like may be added and mixed with the prepolymer. Alternately, the outlet 190 may lead directly to a mixing apparatus of the type disclosed in the co-pending application S.N. 646,471, filed March 15, 1957, and assigned to the assignee of the present invention wherein the prepolymer is mixed and reacted with a component capable of further reaction with the prepolymer to produce polyurethane products.

The conditions under which a prepolymer is reacted to a substantial extent determines the character of the polyurethane which may be prepared therefrom. For example, in the preparation of a prepolymer from a polypropylene glycol and toluene isocyanate, urethane chains are formed when these components are reacted below 212° F. whereas at about 250° F. some allophanate chains are formed. At about 285° F. more allophanate chains than urethane chains are formed. Since the allophanate chains contain reactive hydrogen, these chains aid in cross-linking thereof in the subsequent foam forming reaction. It is readily apparent that a foam formed from a prepolymer reacted at 285° F. will produce a substantially harder foam due to the present of substantial allophanate chains than a foam prepared from the prepolymer reacted below 212° F. since a more highly cross-linked structure produces a more rigid structure.

The initial ratio of the reactive polymeric component to the polyisocyanate component in the preparation of the prepolymer also influences the character of the final product. Thus, a relatively high polyisocyanate proportion in a prepolymer reactive mixer tends to produce a relatively short prepolymer chain length due to a capping off of the hydroxyl groups. The resulting prepolymer has a relatively lower molecular weight, a lesser viscosity and it produces a relatively hard foam product. The same total ratio of the polyisocyanate component to the polymeric component may be reacted therewith by initially reacting a smaller proportion of the polyisocyanate component with the polymeric component. Subsequently, the remaining portion of the polyisocyanate component may be added. As a result, a prepolymer is produced having longer chains, a greater molecular weight and viscosity, and it will produce a softer foam. Other factors also influence the character of the product. Thus, with increased reaction temperatures and shorter reaction times, there is generally a proportional decrease in the viscosity of the prepolymer. If the viscosity of the prepolymer, however, is unusually low, it may be unable to retain the gas developed in the foaming process and hence incapable of producing a satisfactory foam product.

It is readily apparent from the above that the prepolymer must be prepared under highly controlled conditions to produce the desired final polyurethane foam product.

In a specific illustration of the operation of the apparatus and the process involved, all quantities being expressed on a weight basis, a component A is utilized consisting of 100 parts of a polypropylene glycol having an average molecular weight of 2,025, a hydroxyl number of 53 to 59, a maximum acid number of 0.4 and a maximum water content of 0.1% and two parts of hexanetriol 1,2,6 having a hydroxyl number ranging from 1,230 to 1,290, a maximum acid number of 1.0 and a maximum water content of 0.10%. A component B is utilized which consists of 38 parts of tolylene diisocyanate having a 2,6 toluene diisocyanate content of at least 19% and an isocyanate group content of 47.3 to 48.3% and from .008 to .012% hydrolyzable chlorine. These components are passed in the respective steam heated tanks 10 and 12 of the apparatus wherein they are preferably preheated to about 90° F. to improve flowability and to aid in bringing the components to reaction temperature in the subsequent mixing and heating steps and subjected to dry air pressure of about 30 pounds' gauge to insure that the liquids therefrom flood the respective pumps and cause them to operate at full capacity. The pumps 52 and 68 are then placed in operation and the components A and B are then fed to the first mixer and heat exchanger unit 124 in a ratio of 102 parts of component A to 15 parts of component B. Within the unit 124 these components are rapidly mixed and heated to a temperature of 350° F. The volumetric capacity of the unit 124 is 33 cubic inches and the dwell time of the components A and B therein is about 1.98 minutes. The heated and mixed reactants are then continuously passed into the unit 152 wherein the temperature of the reactants is maintained at 350° F. The volume capacity of the unit 152 is 203 cubic inches and the dwell time of the reactants therein is 12.1 minutes. At this point, about 14 minutes after the pumps 52 and 68 are placed in operation, the pump 70 is placed in operation. Thereafter, the reacted material is fed into the unit 182 wherein it is joined by additional component B in a ratio of 23 parts to the 102 parts of the component A and the 15 parts of the component B fed into the unit 124.

The materials are mixed and cooled within the unit 182 to a temperature of 90° F. during the course of a dwell time of 1.7 minutes, after which the material is passed into the storage tank at the flow rate of about 40 pounds per hour.

The flow rate in the line 94 is 29.1 pounds per hour corresponding to a pump speed of pump 52 of 83 r.p.m., in line 98 about 4.3 pounds per hour corresponding to a pump 68 speed of 91 r.p.m., and in line 168 about 6.6 pounds per hour. The flow rates and reaction conditions are accurately controlled and result in a prepolymer having about 9.5% excess isocyanate groups. 100 parts of this prepolymer may then be reacted with 3.6 parts of a further component capable of further reacting with the prepolymer consisting of 27.8 parts of N-methyl morpholine, 8.3 parts of triethylamine and 63.9 parts of water, to produce a relatively soft foam suitable for use in seat cushions.

In a second illustration of the operation of the apparatus and the process involved, a component A is utilized consisting of a mixture of 100 parts of polypropylene glycol having a molecular weight of about 2,000, a hydroxyl number ranging from 53.4 to 59, a maximum acid number of 0.60 and a maximum water content of 0.10, and seven parts of hexane triol. A component B is utilized which consists of 53.5 parts of tolylene diisocyanate having a 2,6 tolylene diisocyanate isomer content of at least 19% and isocyanate group content of 47.3 to 48.3% and from .008 to .012% hydrolyzable chlorine. These components are placed in the tanks 10 and 12 of the apparatus under the dry air pressure and are preheated to about 90° F. The valve 69 is closed and the components A and B are then fed to the first mixer and heat exchanger 124 in a ratio of 107 parts of component A to 53.5 parts of component B. These components are then sequentially mixed and heated to a temperature of 160° F. within unit 124, fully reacted within unit 152 at 160° F. and cooled to 90° F. in unit 182 to produce a prepolymer having about 9% free isocyanate groups, after which the resulting prepolymer is passed into the storage chamber 192. 100 parts of the resulting prepolymer are then reacted with 5 parts of a further component consisting of 43 parts of 1.4 bis di-2 hydroxypropyl-2 methyl piperazine, 2 parts of glycerine and 55 parts water to produce a relatively rigid foam product suitable for use as safety or impact pads for automobiles.

A third example of suitable precursor components for reaction in accordance with the present invention to produce desirable prepolymers consists of a component A consisting of 100 parts of a castor oil having a hydroxyl number of about 160 and an acid number of about 1.75 together with 14.3 parts of polypropylene glycol as a cross-linking agent and a component B consisting of 73.4 parts of a mixture of 80%, 2,4 toluene diisocyanate and 20% 2,6 toluene diisocyanate. The components A and B may be reacted in the manner described in the Example 2 above by feeding the components into the heating and mixing unit 124 in a ratio of 114.3 parts of component A to 73.4 parts of the component B to form a prepolymer having about 9.0 excess isocyanate groups. 33.4 parts of dioctyl sebacate as a plasticizer may then be added to the prepolymer in storage chamber 192. 100 parts of the resulting prepolymer may then be reacted with 4.1 parts of a component consisting of 42.1%, diethylethanolamine, 24% of hydrochloric acid (37%) and 33.9% water to form a relatively rigid foam. Alternately, the component B may be split so as to feed about 36.5 parts thereof into unit 124 and the balance thereof into unit 182 in the manner described in Example 1, and then subsequently reacting the resulting prepolymer with the foam producing component described above to produce a relatively softer foam.

A further example of suitable precursor components for reaction in accordance with the present invention utilizes a component A consisting of a polyester prepared by reacting ethylene glycol and adipic acid to form a polyester having an average molecular weight of about 2,000, a hydroxyl number of about 60, an acid number of about 2 and a viscosity of about 10,000 centipoise at 70° F., and a component B consisting of 65% of 2,4 toluene diisocyanate and 35% 2,6 toluene diisocyanate. The reactants are fed into the unit 124 in the manner of Example 2 in a ratio of 100 parts of the former to 45 parts of the latter to produce a prepolymer having about 8% free isocyanate groups. 100 parts of the prepolymer may then be reacted with 4.2 parts of a component consisting of 2.5 parts water, 0.25 part dimethylethanolamine and 1.5 parts of polyoxyethylene sorbitan monopalmitate as an emulsifier to produce a foam having a highly uniform consistency and physical and chemical properties.

While the embodiments of the present invention as herein disclosed constitute the preferred forms, it is to be understood that other forms may be adopted.

We claim:

1. Apparatus for continuously producing in a single pass a polymer which is the reaction product of components including a polymeric material having a plurality of reactive hydrogen groups and a polyisocyanate comprising a first high velocity mixing and heating unit comprising an elongated cylindrical chamber having a drum rotatably disposed therein and providing a relatively thin elongated annular space therebetween, said drum including a plurality of mixing and scraping blades attached to the periphery thereof and adapted for scraping said chamber surface to expose said surface to fresh portions of said components and means associated with the external sides of said chamber for providing heat thereto; a second heating and mixing unit in fluid-flow relationship with said first unit; a third mixing and cooling unit in fluid-flow relationship with said second unit; first and second conduit and positive displacement pump means in fluid-flow relationship with said first unit adapted for delivering said polymeric material and said polyisocyanate to said first unit in fixed proportions; a third conduit and positive displacement pump means in fluid-flow relationship with said third unit adapted for delivering said polyisocyanate to said third unit in a fixed proportion to the flow of reactants to said third unit; shaft means operatively connected to each of said pump means; and power means for driving said shaft at variable speeds drivingly connected to said shaft means whereby a variation in the speed of said shaft means produces a corresponding variation in the delivery rate of said pumps.

2. Apparatus for continuously producing in a single pass a uniform polyisocyanate-modified polymer which is the reaction product of a first component comprising a polymeric material having a plurality of reactive hydrogen groups and a second component comprising an organic polyisocyanate; the combination of a high velocity heating and mixing means; a reactor means in fluid-flow relation with said heating and mixing means; and a high velocity mixing and cooling means in fluid-flow relation to said reactor means, said heating and mixing means and said heating and cooling means comprising an elongated cylindrical chamber and a drum rotatably disposed therein providing a relatively thin elongated annular space therebetween, said drum including a plurality of mixing and scraping blades attached to the periphery thereof adapted for scraping said chamber wall whereby fresh portions of the components are constantly exposed to the chamber wall and means associated with the external wall of said chamber for providing heat thereto; a first positive displacement pump means adapted to feed said first component into said mixing and heating means at a constant rate; a second positive displacement pump means adapted to feed a first portion of said second component to said mixing and heating means in a fixed proportion to said first component; said mixing and heating means being adapted to thoroughly mix said components and rapidly heat them to a predetermined reaction temperature as said components pass therethrough; said reactor being adapted to maintain said components at said reaction temperature and hold said components for a time sufficient to cause a predetermined reaction thereof as they pass therethrough; a third positive displacement pump means for feeding a second portion of said second components to said mixing and cooling means in a predetermined ratio to the reacted components flowing therethrough, said mixing and cooling means being adapted to cool said reacted components mixed with said second portion below said reaction temperature; variable speed power means operably connected to each of said pump means whereby a variation in the speed of said power means correspondingly varies the speed of each of said pump means.

3. Apparatus for continuously producing in a single pass a uniform polyisocyanate-modified polymer which is the reaction product of a first component comprising a polymeric material having a plurality of reactive hydrogen groups and a second component comprising an organic polyisocyanate; the combination of a high velocity heating and mixing means; a reactor means in fluid-flow relationship with said heating and mixing means; a high velocity mixing and cooling means in fluid-flow relation to said reactor means, said heating and mixing means and said heating and cooling means comprising an elongated cylindrical chamber and a drum rotatably disposed therein providing a relatively thin elongated annular space therebetween, said drum including a plurality of mixing and scraping blades attached to the periphery thereof adapted for scraping said chamber wall whereby fresh portions of the components are constantly exposed to the chamber wall and means associated with the external wall of said chamber for providing heat thereto; said heating and mixing means, said reactor and said mixing and cooling means forming a continuous conduit for said reactants to follow in a single pass; a first positive displacement pump means adapted to feed said first component into said mixing and heating means at a constant rate; a second positive displacement pump means adapted to feed a first portion of said second component to said mixing and heating means in a fixed proportion to said first component; said mixing and heating means being adapted to thoroughly mix said components and rapidly heat them to a predetermined reaction temperature as said components pass therethrough; said reactor being adapted to maintain said components at said reaction temperature and hold them for a time sufficient to cause a predetermined reaction of the components an they pass therethrough; a third positive displacement pump means for feeding a second portion of said components to said mixing and cooling means in a predetermined ratio to the reacted components flowing therethrough; said mixing and cooling means being adapted to cool said reacted components below said reaction temperature as they pass therethrough; and variable speed power means for controlling the pumping rates in accordance with the said ratios.

References Cited in the file of this patent

UNITED STATES PATENTS

| | | |
|---|---|---|
| 81,496 | Gwynn | Aug. 25, 1868 |
| 1,213,143 | Aylsworth | Jan. 23, 1917 |
| 1,895,945 | Semon et al. | Jan. 31, 1933 |
| 2,764,565 | Hoppe et al. | Sept. 25, 1956 |
| 2,779,689 | Reis | Jan. 29, 1957 |
| 2,847,196 | Franklin et al. | Aug. 12, 1958 |
| 2,850,467 | Livingood | Sept. 2, 1958 |
| 2,880,076 | Kircher et al. | Mar. 31, 1959 |
| 2,894,824 | Lanning | July 14, 1959 |
| 2,955,026 | Hollings et al. | Oct. 4, 1960 |

FOREIGN PATENTS

| | | |
|---|---|---|
| 595,607 | Great Britain | Dec. 10, 1947 |

UNITED STATES PATENT OFFICE

CERTIFICATE OF CORRECTION

Patent No. 3,070,427 December 25, 1962

Edward P. Harris et al.

It is hereby certified that error appears in the above numbered patent requiring correction and that the said Letters Patent should read as corrected below.

Column 1, line 41, for "as" read -- a --; column 2, line 17, for "in" read -- an --; line 49, for "he" read -- the --; column 5, line 26, for "158" read -- 168 --; line 63, for "present" read -- presence --; column 10, line 6, for "an" read -- as --.

Signed and sealed this 30th day of July 1963.

(SEAL)
Attest:

ERNEST W. SWIDER
Attesting Officer

DAVID L. LADD
Commissioner of Patents